United States Patent
Choi et al.

(10) Patent No.: US 10,489,515 B2
(45) Date of Patent: Nov. 26, 2019

(54) METHOD AND APPARATUS FOR PROVIDING AUTOMATIC SPEECH TRANSLATION SERVICE IN FACE-TO-FACE SITUATION

(71) Applicant: ELECTRONICS AND TELECOMMUNICATIONS RESEARCH INSTITUTE, Daejeon (KR)

(72) Inventors: Mu Yeol Choi, Daejeon (KR); Sang Hun Kim, Daejeon (KR); Young Jik Lee, Daejeon (KR); Jun Park, Daejeon (KR); Seung Yun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 125 days.

(21) Appl. No.: 15/147,861

(22) Filed: May 5, 2016

(65) Prior Publication Data

US 2016/0328391 A1  Nov. 10, 2016

(30) Foreign Application Priority Data

May 8, 2015 (KR) ........................ 10-2015-0064380
Aug. 21, 2015 (KR) ........................ 10-2015-0118231
Jan. 5, 2016 (KR) ........................ 10-2016-0000860

(51) Int. Cl.
*G06F 17/28* (2006.01)
*G10L 15/00* (2013.01)
*G10L 15/26* (2006.01)
*H04W 40/12* (2009.01)
*G10L 21/0364* (2013.01)
*G10L 13/00* (2006.01)
*G10L 25/21* (2013.01)

(52) U.S. Cl.
CPC .......... *G06F 17/289* (2013.01); *H04W 40/12* (2013.01); *G10L 13/00* (2013.01); *G10L 15/26* (2013.01); *G10L 21/0364* (2013.01); *G10L 25/21* (2013.01)

(58) Field of Classification Search
CPC ..... G10L 15/26; G06F 3/0482; G06F 17/289; H04M 1/72569; H04M 2250/58
USPC ........................................ 704/2–9, 231, 235
See application file for complete search history.

(56) References Cited

U.S. PATENT DOCUMENTS 7,764,954 B2  7/2010  Beyer, Jr.
8,798,985 B2  8/2014  Yun et al.
(Continued)

FOREIGN PATENT DOCUMENTS

KR    20080096097 A   10/2008
KR    20110132960 A   12/2011
KR  10-2015-0026754 A   3/2015

*Primary Examiner* — Olujimi A Adesanya

(57) ABSTRACT

Provided is a method of providing an automatic speech translation service. The method includes, by an automatic speech translation device of a user, searching for and finding a nearby automatic speech translation device based on strength of a signal for wireless communication, exchanging information for automatic speech translation with the found automatic speech translation device, generating a list of candidate devices for the automatic speech translation using the automatic speech translation information and the signal strength, and connecting to a candidate device having a greatest variation of the signal strength among devices in the generated list.

12 Claims, 7 Drawing Sheets

(56) References Cited

U.S. PATENT DOCUMENTS

| | | | |
|---|---|---|---|
| 9,053,097 B2 | 6/2015 | Zivkovic | |
| 9,785,632 B1* | 10/2017 | Beaven | G06F 17/289 |
| 2006/0046709 A1* | 3/2006 | Krumm | H04N 21/4126 |
| | | | 455/422.1 |
| 2008/0102809 A1 | 5/2008 | Beyer | |
| 2009/0210932 A1* | 8/2009 | Balakrishnan | H04W 4/02 |
| | | | 726/5 |
| 2010/0123560 A1 | 5/2010 | Nix et al. | |
| 2010/0299150 A1* | 11/2010 | Fein | G06F 17/289 |
| | | | 704/277 |
| 2011/0283334 A1* | 11/2011 | Choi | G06F 3/04883 |
| | | | 725/148 |
| 2012/0015605 A1* | 1/2012 | Sole | H04W 12/06 |
| | | | 455/41.3 |
| 2012/0253784 A1* | 10/2012 | Maskey | G06F 17/289 |
| | | | 704/3 |
| 2012/0310622 A1* | 12/2012 | Zivkovic | G06F 17/289 |
| | | | 704/3 |
| 2012/0322379 A1* | 12/2012 | Eun | H04M 1/7253 |
| | | | 455/41.2 |
| 2014/0080416 A1* | 3/2014 | Seo | H04M 1/7253 |
| | | | 455/41.2 |
| 2014/0273849 A1* | 9/2014 | Lee | G06F 1/1694 |
| | | | 455/41.2 |
| 2015/0050880 A1* | 2/2015 | Choi | H04W 76/10 |
| | | | 455/39 |
| 2015/0088518 A1* | 3/2015 | Kim | G06F 3/167 |
| | | | 704/251 |
| 2015/0163748 A1* | 6/2015 | Hrabak | H04W 52/0245 |
| | | | 455/41.2 |
| 2015/0169551 A1 | 6/2015 | Yun et al. | |
| 2015/0341450 A1* | 11/2015 | Reunamaki | H04L 67/18 |
| | | | 705/14.58 |
| 2015/0371529 A1* | 12/2015 | Dolecki | G08C 17/02 |
| | | | 700/94 |
| 2016/0105924 A1* | 4/2016 | Baek | H04W 4/008 |
| | | | 455/41.2 |
| 2016/0179462 A1* | 6/2016 | Bjorkengren | G06F 3/167 |
| | | | 704/275 |
| 2016/0350060 A1* | 12/2016 | Park | G06F 17/24 |
| 2017/0060850 A1* | 3/2017 | Lewis | G06F 17/289 |

\* cited by examiner

METHOD AND APPARATUS FOR PROVIDING AUTOMATIC SPEECH TRANSLATION SERVICE IN FACE-TO-FACE SITUATION

CROSS-REFERENCE TO RELATED APPLICATIONS

This application claims priority under 35 U.S.C. § 119 to Korean Patent Application No. 10-2015-0064380, filed on May 8, 2015, No. 10-2015-0118231, filed on Aug. 21, 2015, and No. 10-2016-0000860, filed on Jan. 5, 2016, the disclosure of which is incorporated herein by reference in its entirety.

TECHNICAL FIELD

The present invention relates to automatic speech translation, and more particularly, to a method of establishing or ending a connection between devices that support an automatic speech translation service in a face-to-face situation.

BACKGROUND

When persons who speak different languages meet, there occurs a lack of communication due to a language barrier. The persons try to communicate with each other by expressing extremely restrictive opinions with a look or gesture or by using a text translation service of an Internet service provider. However, there are limitations in this case, compared to a case in which they communicate in their mother languages.

Automatic speech translation technology has been developed for persons with different languages to communicate with each other.

The combination of a smartphone and a wearable device provides an environment in which it is further convenient to use automatic speech translation. When an automatic speech translation service is used with only a smartphone, a person should hold the smartphone at a position where voice is recognizable, that is, in the vicinity of his/her face, and thus there is an inconvenience that one hand is not free. However, the utilization of the wearable device allows both hands to be free. A smartphone and a wearable device are connected through a protocol such as Bluetooth Low Energy (BLE), and the wearable device may also control a start and an end of an automatic speech translation service.

Such an automatic speech translation service includes a connection method in which personal information such as a phone number of a partner or an identification number and an ID of a speech translation service subscriber is utilized (1st generation) and a connection method in which, when a partner is in close proximity, both terminal are brought in contact with each other using a gesture, bump-to-bump, infrared pointing, etc., and then recognized by each other (2nd generation). However, the conventional methods have inconveniences in that a user and his/her partner should check their intentions for speech translation and manually set up connection according to a predetermined rule.

When a manual connection is performed to start a speech translation service between users, there are some problems. That is, the execution of a speech translation app is recommended, or even when the app is executed, intentions for speech translation between users are necessarily checked by bringing in contact with their terminals. Also, a mother language of a partner with the speech translation intention should be at least recognized to start the speech translation service.

Furthermore, when both hands are not free, e.g., when a waiter/waitress receives an order and serves a table or a taxi driver is driving, the conventional manual connection methods cannot smoothly provide the speech translation service.

SUMMARY

Accordingly, the present invention provides an automatic speech translation connection method in which a speech translation session may be automatically started through an automatic speech translation interface that is the most similar to a human communication process.

The present invention is not limited to the above objectives, but other objectives not described herein may be clearly understood by those skilled in the art from descriptions below.

In one general aspect, a method of providing an automatic speech translation service includes, by an automatic speech translation device of a user, searching for and finding a nearby automatic speech translation device based on strength of a signal for wireless communication; exchanging information for automatic speech translation with the found automatic speech translation device; generating a list of candidate devices for the automatic speech translation using the automatic speech translation information and the signal strength; and connecting to a candidate device having a greatest variation of the signal strength among devices in the generated list.

In another general aspect, an automatic speech translation device including at least one processor for performing automatic speech translation includes a communication unit configured to receive a signal for determining proximity information of an automatic speech translation device near the automatic speech translation device and transmit or receive automatic speech translation information to or from the nearby automatic speech translation device; a control unit configured to generate a list of candidate devices for the automatic speech translation based on strength of the received signal and based on the received automatic speech translation information, connect to a candidate device having a greatest variation of the signal strength among devices in the generated list, and start an automatic speech translation session; and a calculation unit configured to perform automatic speech translation together with the connected automatic speech translation device.

Other features and aspects will be apparent from the following detailed description, the drawings, and the claims.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

Figure 1:
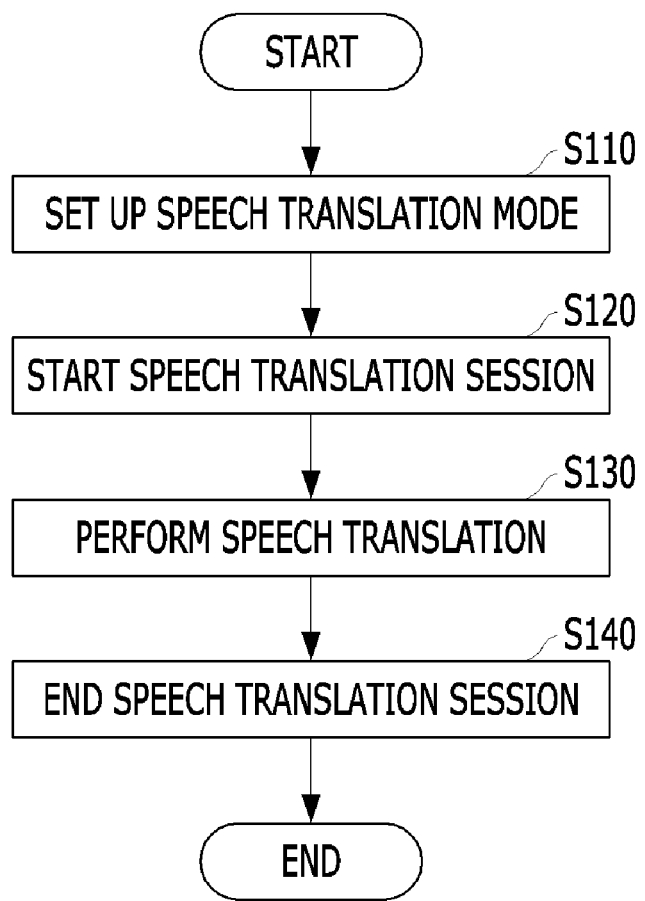
FIG. 1 is a flowchart showing a method of performing a speech translation mode of an automatic speech translation service according to an embodiment of the present invention.

FIG. 1 is a flowchart showing a speech translation session according an embodiment of the present invention.

In a speech translation mode setup step (S110), a user sets up an automatic speech translation device based on a wearable device such as his/her own smartphone. The setup may be performed through a settings menu of the automatic speech translation device or an application of the smartphone.

In the speech translation mode setup step (S110), a user may set up an automatic speech translation mode option, his/her automatic speech information, and selective information.

The automatic speech translation mode option is an option in which an automatic speech translation device of the user automatically starts and ends a speech translation session. When the automatic speech translation mode is set up to be "off," the automatic speech translation device starts and ends a speech translation session by a manual operation of the user in a conventional method.

The speech translation information is information that is needed to automatically search for a device to be speech-translated when the automatic speech translation mode is activated (that is, "on") and may set a first language needed for speech translation and also second and third languages capable of communication. Typically, the first language may be set as his/her mother language, and also a language capable of communication other than the mother language may be set as the second or third language in preparation for a case in which a device of a partner does not support automatic speech translation of the first language. A user may avoid an inconvenience in subsequent automatic connection because such speech translation information is set just once when the automatic speech translation device or smartphone application is initially executed.

The selective information may include a gender of the user, a name of the user, a signal strength setting value, etc.

The signal strength may be set in high/medium/low or 10 levels. When the signal strength is set as high, the device of the partner, which is to be connected, should have signal strength greater than or equal to certain strength, and thus should be positioned not far from the user. As a result, the number of searches for devices to be automatically speech-translated decreases. When the signal length is set as low, the devices to be automatically speech-translated are found as much as possible. Since there are too many devices to be automatically speech-translated, an automatic speech translation conversation may be confused, and thus the number of devices is needed to be set as an appropriate value depending on surrounding circumstances.

In a speech translation session start step (S120), when the automatic speech translation mode is set up to be "on," the automatic speech translation device of the user searches for devices to be speech-translated, automatically performs connection, and starts a speech translation session. When the automatic speech translation device of the user is connected with a speech translation device of a partner, may inform a current state of the automatic speech translation device to other users by outputting an alarm sound, such as "ding-dong," which informs that the speech translation session is started or by using an LED informing a state of the wearable device to display a red color when the automatic speech translation is in a standby state and display a green color when the automatic speech translation device is connected.

When the automatic speech translation session starts in step S120, a conversation using automatic speech translation is made with other users being connected in step S130. When a condition for ending the speech translation is satisfied, the speech translation session ends automatically in step S140, in the same way as it began.

Figure 2:
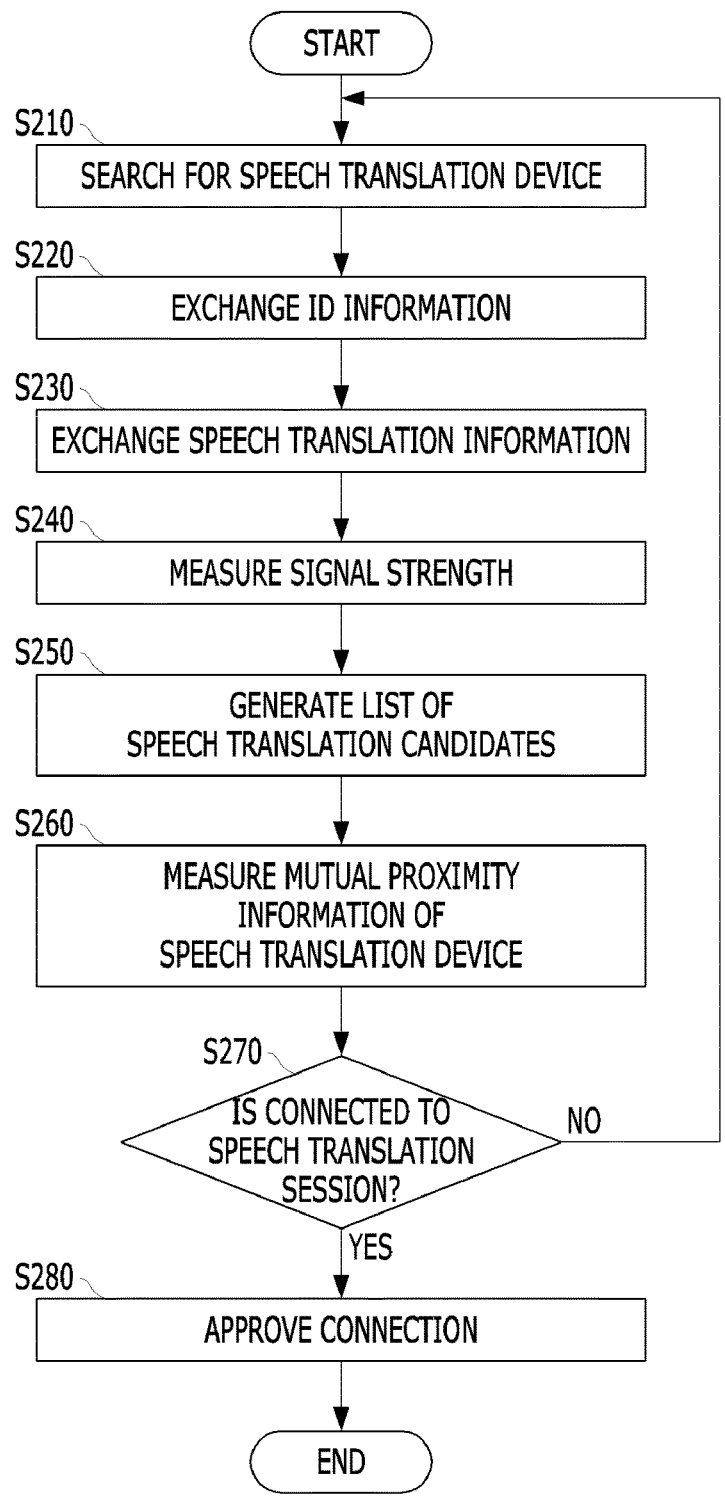
FIG. 2 is a flowchart showing a method of starting a speech translation session of an automatic speech translation service according to an embodiment of the present invention.

FIG. 2 is a flowchart showing in detail a step of setting up connection between automatic speech translation devices in order to start a speech translation session in step S120 while such an automatic speech translation is performed.

An automatic speech translation device of a user searches for nearby automatic speech translation devices using a Bluetooth Low Energy (BLE) signal in step S210. Various signals such as a Wi-Fi signal or a signal for mobile communication, e.g., 3G or LTE may be used instead of the BLE signal.

Since such a BLE signal or WiFi signal has different signal strength depending on the types of devices, an accurate distance between the devices cannot be determined using the signal strength. Thus, ultrasonic signals that are set to be transmitted or received at predetermined strength in order for distance determination or GPS signals may be used to also determine a more accurate distance between the devices.

The found devices exchange their IDs with each other in step S220. Information regarding the IDs refers to information that may identify devices, such as a unique media access control (MAC) address of the automatic speech translation device.

Next, the automatic speech translation device exchanges speech translation information including predetermined first language information with the found devices in step S230 to check whether a language set up for a device of a partner is a language that may support an automatic speech translation service. In addition, when a language set up by the user is also set up for the device of the partner, a speech translation service is not needed, and thus the device is removed from an automatic speech translation candidate list.

When devices that may support the automatic translation service among nearby devices are determined, the automatic speech translation device measures signal strength of the devices in step S240 and aligns the devices in the order of signal strength to generate a speech translation list in step S250.

The automatic speech translation device searches the generated list for nearby devices and then measures mutual proximity information to determine a partner device to be connected. In this case, the partner device to be connected is determined in consideration of a moving route of a user, instead of connecting to a device having the greatest signal strength in the order of signal strength or a device having signal strength greater than or equal to a certain threshold.

Figure 3A:
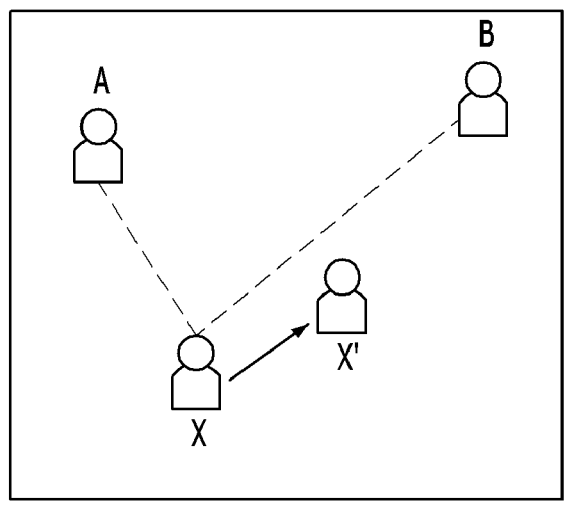
FIGS. 3A, 3B and 3C are view showing a method of selecting a target for an automatic speech translation service according to an embodiment of the present invention.

FIG. 3A is a view showing a method of determining an object to be speech-translated in consideration of a moving route of a user in the step of measuring mutual proximity information between speech translation devices in S260.

Before the movement, the user is located at position X. In this case, when a signal strength difference between a user device and a partner device located at position A and a signal strength difference between the user device and a partner device located at position B are $D_A$ and $D_B$, respectively, the user device has a signal strength difference with the partner device located at position A greater than with the partner device located at position B, that is, $D_A > D_B$, because the user device is closer to position A than to position B.

However, when the user moves from X to X', when a variation of the signal strength difference with the partner device located at position A and a variation of the signal strength difference with the partner device located at position B, that is, $\Delta D_A$ and $\Delta D_B$ are compared, there is little change in $\Delta D_A$, and thus $\Delta D_A < \Delta D_B$. Accordingly, the device of the user is not connected with a device located at position A, but connected with a device located at position B.

Such a connection method includes connecting with a device having a maximum variation among $\Delta Dn$ (n=1, 2, ... N). This means that the device of the user becomes close to the device having the greatest $\Delta Dn$ most quickly because the user approaches the device. Accordingly, such a method of comparing $\Delta Dn$ has significance when N is equal to or greater than 2.

In addition, in order to further increase sensitivity to movement of the user, a variation $\Delta\Delta Dn$ of $\Delta Dn$ may also be used in addition to the variation $\Delta Dn$ of the signal strength difference. In this case, a further sensitive change may be measured and thus a further accurate connection is allowed.

Figure 3B:
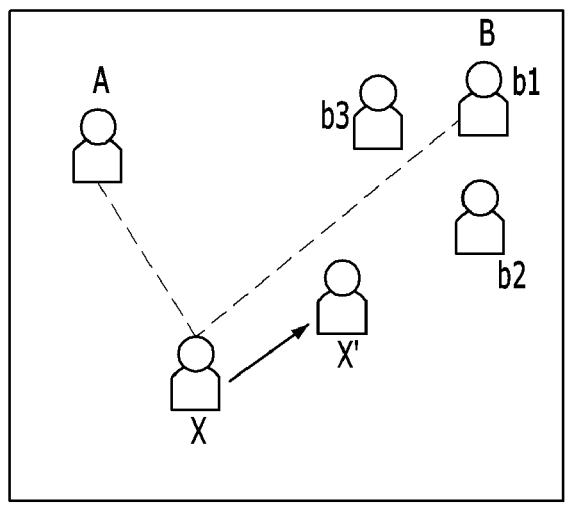

FIG. 3B shows a method of determining a device to be automatically speech-translated when there are several automatic speech translation candidates at similar positions.

On a condition that three users b1, b2, and b3 are located at position B, unlike FIG. 3A, when the user moves from X to X', $\Delta D_A$ becomes relatively smaller than other objects and thus may be removed from the connection candidates, but $\Delta D_{b1}$, $\Delta D_{b2}$ and $\Delta D_{b3}$ have similar values.

In this case, the device of the user may connect to a user having a greatest $\Delta D_A$, and may also try to connect to three users at the same time because the three users may make a conversation at the same time when the three users are located together at similar positions. Accordingly, differences among $\Delta D_{b1}$, $\Delta D_{b2}$ and $\Delta D_{b3}$ or among $\Delta\Delta D_{b1}$, $\Delta\Delta D_{b2}$, and $\Delta\Delta D_{b3}$ are equal to or less than a predetermined threshold, the device of the user may attempts to connect to all of the three users, instead of selecting only one user from thereamong to attempt for automatic speech translation connection, thus allowing an automatic speech translation connection to be naturally performed by participating in a conversation in progress.

Figure 3C:
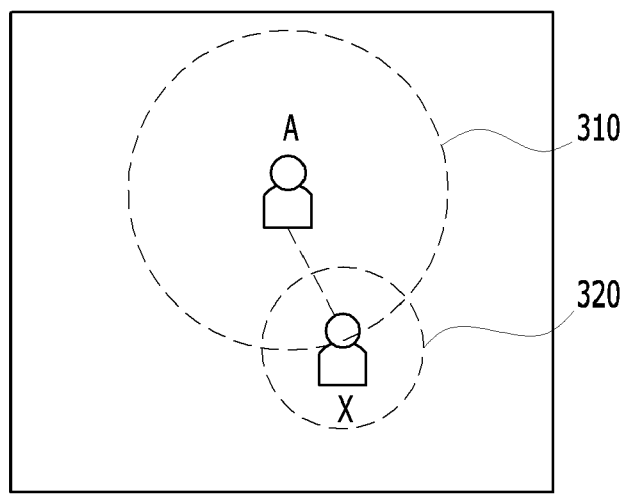

FIG. 3C is a view showing a signal range for maintaining an automatic speech translation session after a user starts automatic speech translation. When user X enter a signal range 310 of partner A who is a partner for speech translation, an automatic speech translation is started, a movement of user X is allowed in an automatic speech translation session maintenance range 320, and thus a region for maintaining a natural conversation may be set up.

Furthermore, the user may keep a conversation while approaching or receding from a partner of the automatic speech translation conversation, in order to prevent the conversation from being automatically ended unlike the user's intention. In detail, if the automatic speech translation is automatically ended as the user recedes from the partner, the conversation may be repeatedly connected and disconnected, thus causing a natural conversation to be interrupted and also causing too much power consumption of the automatic speech translation device.

To this end, by allowing $(-)\Delta D$ or $(-)\Delta\Delta D$ up to a predetermined threshold, the user may naturally maintain an automatic speech translation session while approaching or receding from the partner.

After the step of measuring mutual proximity information between speech translation devices for automatic speech translation in the above-described method in step S260, the processing determines whether to connect a speech translation session in step S270. Subsequently, when there is a device to be connected, the user approves the connection in step S280 to make an automatic speech translation conversation. On the other hand, when there is no device to be connected, the processing returns to the step of searching for speech translation devices (step S210) and then searches for another object to be speech-translated.

When the speech translation session is started, an automatic speech translation device of the user uses an automatic speech translation system, which may include a server type system that performs speech translation through communication with a separate speech translation server and a terminal type system that is installed in the automatic speech translation device to perform speech translation.

The automatic speech translation system performs speech translation by recognizing a voice of the user, converting the voice into texts, translating the converted texts in a language of a partner, synthesizing the translated texts into a corresponding voice, and then reproducing the voice to the partner.

The level of the synthesized voice in the automatic speech translation device which is performing automatic speech translation is adjusted according to the level of the voice of the user or the partner. In addition, when a group conversation is made between several persons, an actual environment in which the volume of the voice decreases as the distance therebetween increases may be reflected by adjusting the voice of a partner far from the user to a low volume and adjusting the voice of a partner close to the user to a high volume.

When a conversational partner moves to another place or an undesired person is connected after a connection between the automatic speech translation devices is approved to start a conversation, the connection may be manually ended. However, according to an embodiment of the present invention, it is also possible to examine a conversation pattern and a movement pattern of the user and automatically end the speech translation session.

Figure 5:
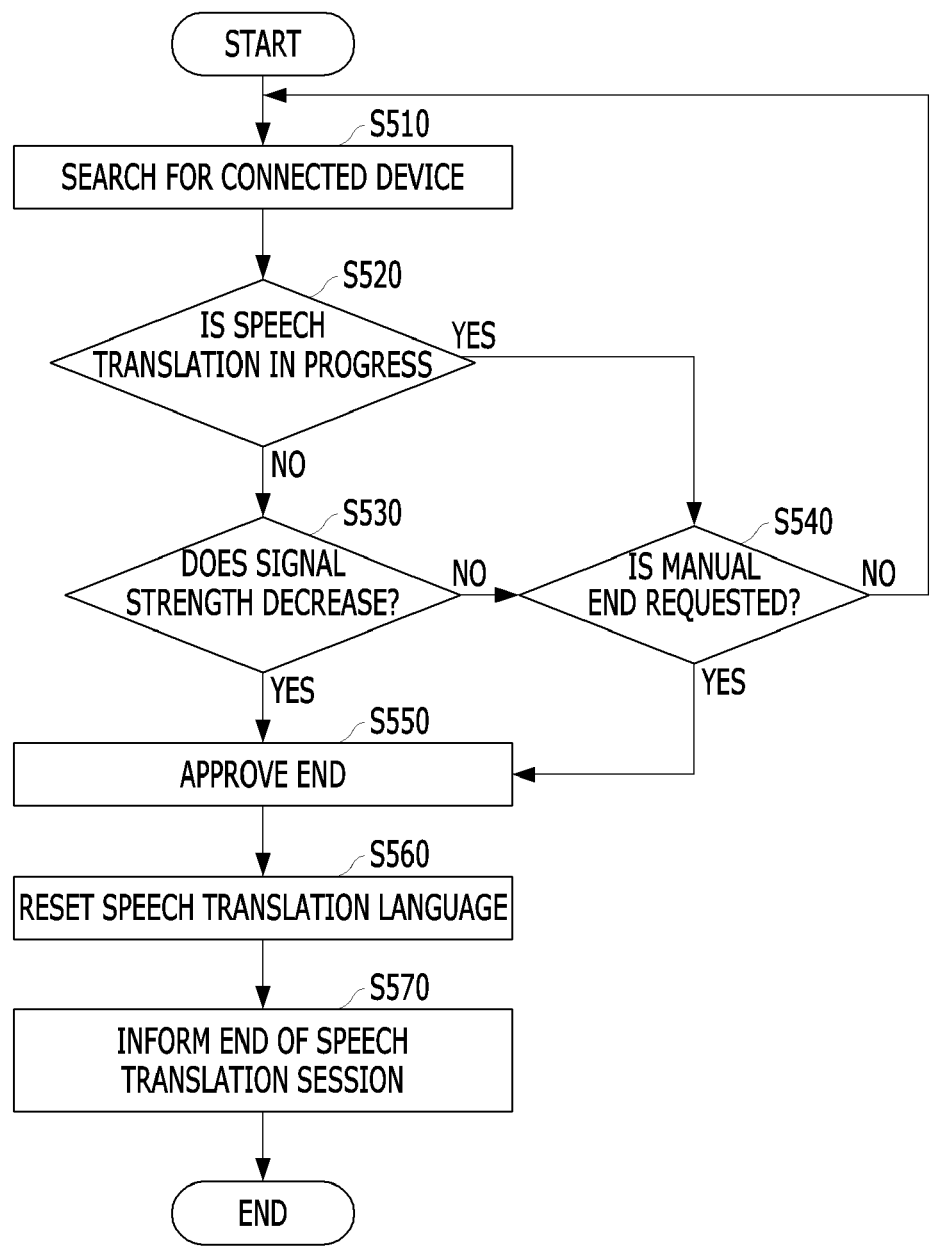
FIG. 5 is a flowchart showing a method of ending an automatic speech translation service according to an embodiment of the present invention.

FIG. 5 is a flowchart showing an end step of a speech translation session.

Since a user device connected with a partner for speech translation consistently communicates a result for the speech translation, the user device may search for a connected device at certain intervals in step S510 and check whether the speech translation is in progress in step S520.

When the automatic speech translation is in progress, the automatic speech translation device repeatedly checks whether there is a manual end request from the user in step S540, and keeps performing the automatic speech translation and searches for the connected device when there is no manual end request in step S510. The manual end request may be performed by operation of a smartphone by a user or through a wearable device, for example, including tapping a touch sensor of the wearable device twice in a row.

When the speech translation is stopped, the automatic speech translation device determines signal strength again, instead of instantly ending the speech translation in step S530. Thus, the automatic speech translation device may start the automatic speech translation conversation again when the conversation is paused to check a cell phone.

When the signal strength does not decrease, the automatic speech translation device determines whether there is the manual end request again in step S540 and determines whether to manually end the automatic speech translation.

When the signal strength decreases, this means that a conversational partner becomes far from the user. Thus, when a difference in the signal strength decreases to below a predetermined threshold, the end of the automatic speech translation may be approved in step S550.

When the end of the speech translation is automatically or manually approved, the automatic speech translation device resets a speech translation language in step S560 and informs a user that the speech translation session has been ended, through a sound or LED of the automatic speech translation device in step 570.

Figure 6:
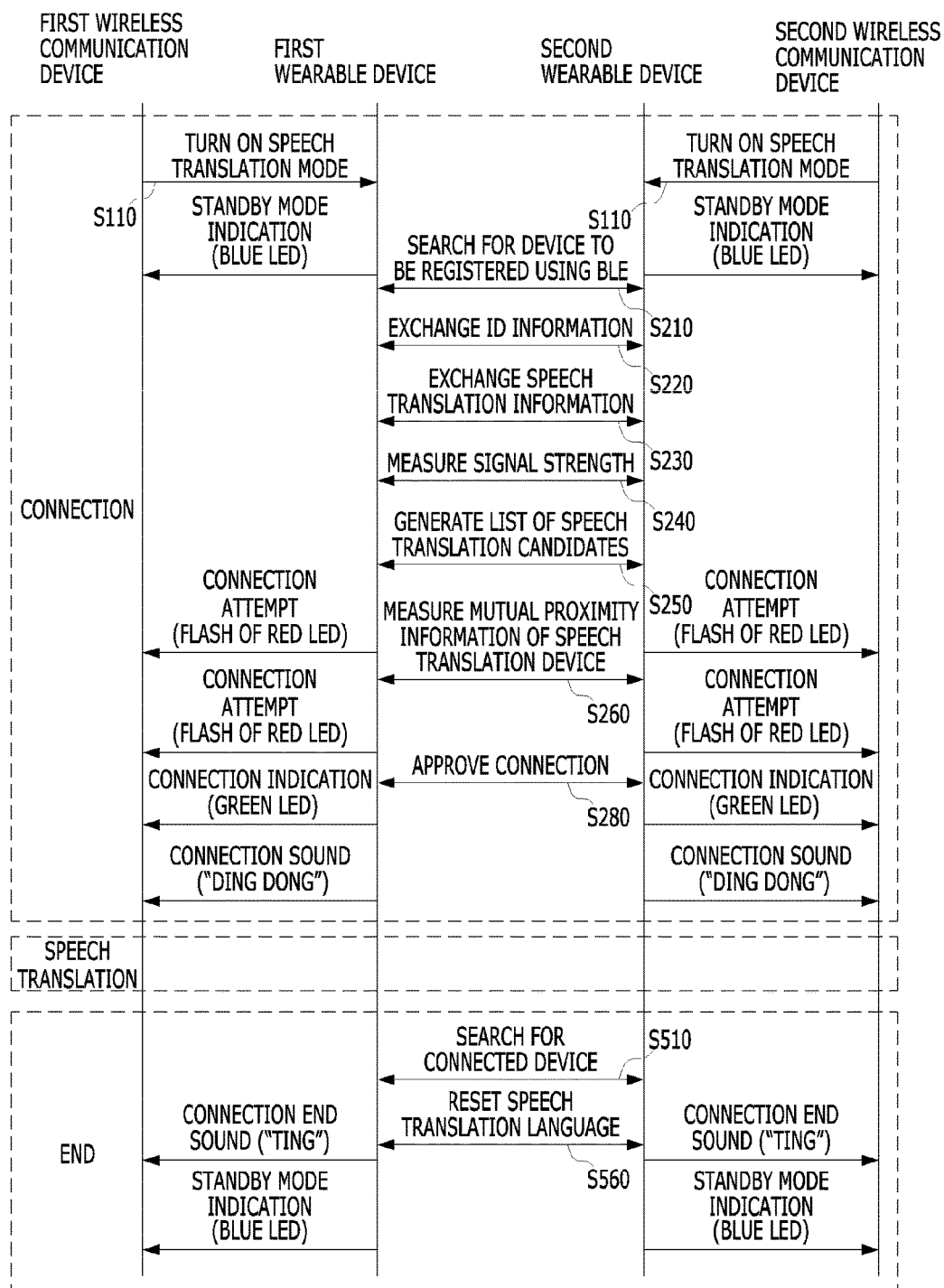
FIG. 6 is a flowchart showing a method of connecting to an automatic speech translation service and ending the connection according to an embodiment of the present invention.

FIG. 6 shows a flowchart of a connection process, a speech translation process, and an end process when two persons perform automatic speech translation using a smartphone and a wearable device.

When an automatic speech translation mode is set to be "on" in a smartphone (e.g., a first or second wireless communication device) of a user, an LED of the wearable device is displayed in blue to indicate an automatic speech translation standby state in step S110.

Wearable devices search for a nearby wireless communication device to be registered using a BLE in step S210, and exchange ID information of the devices and speech translation information for speech translation with each other in steps S220 and S230.

The wearable devices search for signal strength to generate a list of speech translation candidates in step S250. When mutual proximity information is measured using a variation of signal strength while a user moves in step S260, each wearable device may determine which user is approaching using a result of the measurement, approve connection to a device that is approaching, and then start an automatic speech translation conversation.

The wearable device generates a list of speech translation candidates in step S250 and flashes the LED in red to indicate that the wearable device is attempting a connection while measuring the mutual proximity information in step S260. After approving the connection in step S280, the wearable device informs that the connection is successful by using a sound "Ding Dong" and changes the LED to green to indicate that the automatic speech translation conversation is in progress.

The wearable device consistently communicates a speech translation result with a connected device while the automatic speech translation is performed. When there is no speech translation result in step S510, the wearable device determines whether a manual end condition or an automatic end condition is satisfied. When a speech translation end situation is determined, the wearable device resets a speech translation language in step S560 and ends the connection.

When the connection is ended, the wearable device informs of an end of the automatic speech translation conversation by way of a sound "Ting", displays the LED in blue to indicate that the automatic speech translation is in a standby mode, and then await another automatic speech translation session.

As described above, an automatic speech translation interface that is performed on the basis of a human behavior pattern may extend to even a case in which existing automatic speech translation is performed on a conversation between N persons in N languages. For example, when two users start a speech translation session and has a conversation, a third party participates in the speech translation session to form a group having three or more persons.

When two persons start a first speech translation session to perform a speech translation conversation, a third party approaches one of the participants in the first speech translation session to talk to the participant. When the above-described speech translation session connection condition is satisfied, the first communication session that was performed by two persons is changed to a group speech translation session of three persons.

In such a group speech translation session, a connection condition is satisfied when the third party uses a different language from at least one of the participants in the speech translation session that is in progress.

For the group speech translation session, even when the automatic speech translation device does not provide speech translation for some languages of users who participate in the conversation, speech translation of the languages may be provided through a speech translation session of another user.

For example, assumes that, while an automatic speech translation session is in progress in Korean and English by user A and user B, user C who spokes French desires to participate in the group speech communication session, but a device of user C does not support speech translation in Korean, but support speech translation in only English. In this case, French of user C cannot be directly delivered to user A, but translated in English through user B and then delivered to user A. An automatic speech translation device of user A may translate English into Korean to provide the conversation of user C to user A.

The group speech translation session uses a similar end method to the mutual speech translation session. However, in the group speech translation session, whether the speech translation is in progress is not checked. This is because, in a conversation including three or more persons, some persons may not have a conversation, but just listen to the other persons depending on the persons. Accordingly, in the group speech translation session, only when a user becomes far from the group, a method of checking this situation and ending the speech translation session is used.

Figure 7:
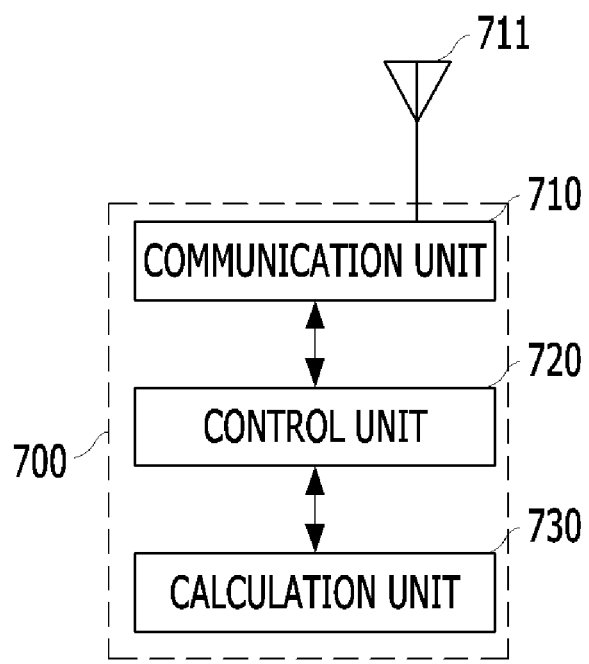
FIG. 7 is a block diagram showing an automatic speech translation device according to another embodiment of the present invention.

FIG. 7 shows a block diagram of an automatic speech translation device 700 according to another embodiment of the present invention.

The automatic speech translation device 700 includes a communication unit 710, a control unit 720, and a calculation unit 730.

The communication unit 710 transmits and receives a signal to communicate information with another automatic translation device through an antenna 711.

The control unit 720 generates a list of candidate devices for performing automatic speech translation on the basis of automatic speech translation information and strength of the signal received by the communication unit 710. As described above, the control unit 720 may perform a connection to a device that is determined as being approaching on the basis of a variation of the signal strength, instead of performing a connection to a device having the greatest signal strength in the generated list.

The calculation unit 730 performs automatic speech translation together with the connected device, and a result of the automatic speech translation is communicated with a partner device through the communication unit 710.

Figure 4:
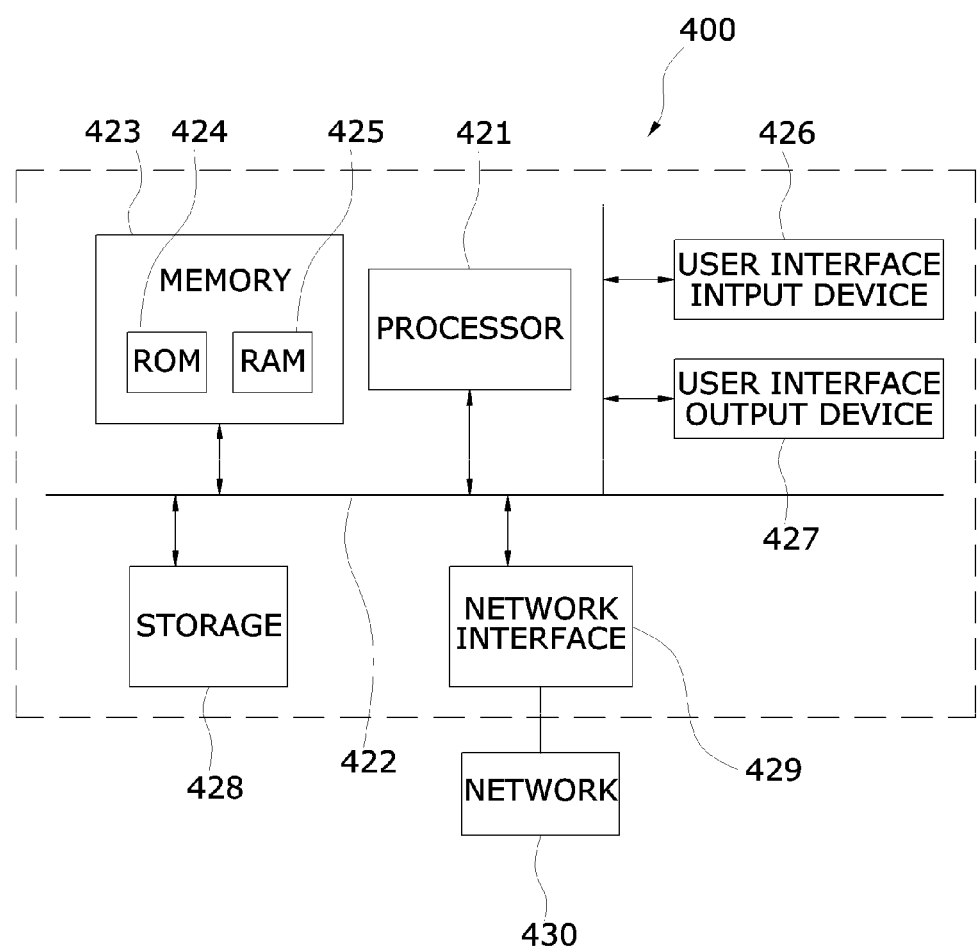
FIG. 4 is a block diagram showing a computer system according to another embodiment of the present invention.

The method of providing an automatic speech translation service according to an embodiment of the present invention may be implemented in a computer system or recorded in a recording medium. As shown in FIG. 4, a computer system may include at least one processor 421, a memory 423, a user input device 426, a data communication bus 422, a user output device 427, and a storage 428. The above-described elements perform data communication through the data communication bus 422.

The computer system may further include a network interface 429 that is coupled to a network. The processor 421 may be a central processing unit (CPU), or a semiconductor device that processes instructions stored in the memory 423 and/or the storage 428.

The memory 423 and the storage 428 may include various forms of volatile or non-volatile storage media. For example, the memory 423 may include a read only memory (ROM) 424 and a random access memory (RAM) 425.

Accordingly, the method of providing the automatic speech translation service according to an embodiment of the present invention may be implemented in a method that is executable in a computer. When the method of providing the automatic speech translation service according to an embodiment of the present invention is performed in a computer device, computer-readable instructions may perform the recognition method according to an embodiment of the present invention.

The method of providing the automatic speech translation service according to an embodiment of the present invention can also be implemented as computer-readable codes in a computer-readable recording medium. The computer-readable recording medium includes any type of recording device for storing data which may be read by the computer device. Examples of the computer readable recording medium may include a ROM, a RAM, a magnetic disk, a flash memory, optical data storage device, etc. The computer readable recording medium can also be distributed over computer systems connected through a computer communication network so that the computer readable code is stored and executed in a distributed fashion.

According to an embodiment of the present invention, unlike a conventional automatic speech translation scheme in which a user has to manually perform a connection, it is possible to automatically set up and connect to a conversational partner using a variation of signal strength without the intervention of the user. Furthermore, since ID information and speech translation information are previously exchanged between devices, a conversation may be performed through an automatic device setup rather than a speech translation language setup, and also the start and end of the conversation may be naturally performed on the basis of human behaviors. Accordingly, the user may have a conversation with a sense of difference.

According to an embodiment of the present invention, it is possible to perform a connection to automatic speech translation and an end of the connection as if a general conversation is made, without a special behavior of a user, for example, a manual setup or attempt of an automatic speech translation connection.

In addition, along with the wide user of a hand-free earphone, a smart watch, or a glasses-type wearable device, a wearable device checks a speech translation condition between users without manipulation of a smartphone by a user, and automatically starts a speech translation session based on mutual proximity information between the users, thus allowing natural speech translation. Furthermore, when it is determined that the users becomes farther away from each other, the wearable device ends the speech translation session. Accordingly, a function of naturally ending the conversation may be implemented on the basis of a situation in which two persons move in a direction away from each other after a conversation is finished.

The above-described wearable-device-based automatic speech translation method may allow both hands to be free, thus maximizing the effect of the speech translation in various working environments in which both hands have to be used, such as shopping, sightseeing, etc.

While the configuration of the present invention has been particularly shown and described with reference to the appending drawings and preferred embodiments, it will be understood by those of ordinary skill in the art that various changes in form and details may be made therein without departing from the spirit and scope of the present invention. Accordingly, the technical scope of the present invention should not be limited to the above-described embodiments, but be determined only by the technical concept of the appended claims.

What is claimed is:

1. A method of providing an automatic speech translation service by an automatic speech translation device of a user, the method comprising:
   searching for and finding a nearby automatic speech translation device based on strength of a signal for wireless communication;
   exchanging automatic speech translation information with the found automatic speech translation device;
   generating a list of candidate devices for the automatic speech translation using the automatic speech translation information and the signal strength; and
   connecting to a candidate device based on a variation of signal strength difference and a variation of the variation of signal strength difference among devices in the generated list by considering a moving route of the automatic speech translation device of the user.

2. The method of claim 1, wherein the connecting comprises performing a group conversation by connecting all of a device having a greatest variation of the signal strength among the devices in the generated list and a device having a signal strength variation difference with the device having the greatest variation of the signal strength equal to or less than a predetermined threshold.

3. The method of claim 1, wherein the searching comprises using signal strength of a Bluetooth signal, a Wi-Fi signal, or an ultrasonic signal of the automatic speech translation device to search for the nearby automatic speech translation device.

4. The method of claim 1, further comprising, after the connecting, an automatic speech translation step in which a volume of a voice of a partner is adjusted in proportion to a distance with the partner, the distance being determined using signal strength of the automatic speech translation device of the partner after the automatic speech translation is started.

5. The method of claim 1, further comprising, after the connecting:
  determining whether the speech translation is in progress;
  determining signal strength of an automatic speech translation device of a partner when the speech translation is not in progress; and
  determining that the automatic speech translation device of the partner becomes far from the user to end the connection when the signal strength decreases.

6. The method of claim 1, wherein signal strength differences between the automatic speech translation device of the user and one of the devices in the generated list when the user is at a first position and a second position are a first signal strength difference and a second signal strength difference, respectively, the first position and the second position being on the moving route of the automatic speech translation device of the user.

7. An automatic speech translation device including at least one processor for performing automatic speech translation, the processor comprising:
  a communication unit configured to receive a signal for determining proximity information of a nearby automatic speech translation device and transmit or receive automatic speech translation information to or from the nearby automatic speech translation device;
  a control unit configured to generate a list of candidate devices for the automatic speech translation based on strength of the received signal and based on the received automatic speech translation information, connect to a candidate device based on a variation of signal strength difference and a variation of the variation of signal strength difference among devices in the generated list by considering a moving route of the automatic speech translation device, and start an automatic speech translation session; and
  a calculation unit configured to perform the automatic speech translation together with the connected automatic speech translation device.

8. The automatic speech translation device of claim 7, wherein the control unit performs a group conversation by connecting all of a device having a greatest variation of the signal strength among the devices in the generated list and a device having a signal strength variation difference equal to or less than a predetermined threshold.

9. The automatic speech translation device of claim 7, wherein the communication unit uses signal strength of a Bluetooth signal, a Wi-Fi signal, or an ultrasonic signal to determine the proximity information.

10. The automatic speech translation device of claim 7, wherein the calculation unit adjusts a volume of a voice of a partner in proportion to a distance with the partner, the distance being determined using signal strength of the automatic speech translation device of the partner.

11. The automatic speech translation device of claim 7, wherein the calculation unit ends the automatic speech translation by steps including:
  determining whether the speech translation is in progress;
  determining signal strength of an automatic speech translation device of a partner when the speech translation is not in progress; and
  determining that the automatic speech translation device of the partner becomes far from the user to end the connection when the signal strength decreases.

12. The automatic speech translation device of claim 7, wherein signal strength differences between the automatic speech translation device of the user and one of the devices in the generated list when the user is at a first position and a second position are a first signal strength difference and a second signal strength difference, respectively, the first position and the second position being on the moving route of the automatic speech translation device of the user.

* * * * *